United States Patent
Kondo

(10) Patent No.: US 11,206,250 B2
(45) Date of Patent: Dec. 21, 2021

(54) COORDINATION SUPPORT SYSTEM, COORDINATION SUPPORT METHOD, AND NON-TRANSITORY COMPUTER-READABLE STORAGE MEDIUM

(71) Applicant: Ricoh Company, Ltd., Tokyo (JP)

(72) Inventor: Seiichi Kondo, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 359 days.

(21) Appl. No.: 16/355,772

(22) Filed: Mar. 17, 2019

(65) Prior Publication Data
US 2019/0306146 A1    Oct. 3, 2019

(30) Foreign Application Priority Data
Mar. 30, 2018  (JP) .............................. JP2018-068920

(51) Int. Cl.
*H04L 29/06* (2006.01)
*G06F 3/12* (2006.01)
(Continued)

(52) U.S. Cl.
CPC ........ *H04L 63/0807* (2013.01); *G06F 3/1203* (2013.01); *G06F 3/1222* (2013.01);
(Continued)

(58) Field of Classification Search
CPC ... H04L 63/0807; H04L 63/08; H04L 63/083; G06F 3/1203; G06F 3/1222;
(Continued)

(56) References Cited

U.S. PATENT DOCUMENTS 6,360,254 B1    3/2002  Linden et al.
8,955,041 B2 *  2/2015  Esaki ..................... H04L 63/08
                                                                726/1
(Continued)

FOREIGN PATENT DOCUMENTS

JP    2014-092823    5/2014
JP    2018-032091    3/2018

OTHER PUBLICATIONS

Extended European Search Report dated Jul. 5, 2019 in Patent Application No. 19160919.7, 9 pages.

*Primary Examiner* — Catherine Thiaw
(74) *Attorney, Agent, or Firm* — Xsensus LLP

(57) ABSTRACT

A coordination support system includes circuitry configured to: accept login information including user identification information and coordination identification information of a coordination process to be executed from a device; determine whether coordination setting for execution of the coordination process identified by the coordination identification information is configured; store an authentication ticket and a temporary token in association with each other based on a determination that the coordination setting is not configured, the authentication ticket indicating authentication of use of a function of the service providing apparatus executing the coordination process, and the temporary token indicating permission of use of the service providing apparatus; and transmit setting information including address information and the temporary token to a destination indicted by a communication address of a user identified by the user identification information, the address information indicating a storage location of a setting screen.

5 Claims, 11 Drawing Sheets

(51) Int. Cl.
*G06F 21/42* (2013.01)
*G06F 21/33* (2013.01)
*H04W 12/06* (2021.01)

(52) U.S. Cl.
CPC .......... *G06F 3/1238* (2013.01); *G06F 3/1253* (2013.01); *G06F 3/1285* (2013.01); *G06F 21/335* (2013.01); *G06F 21/42* (2013.01); *H04L 63/08* (2013.01); *H04L 63/083* (2013.01); *H04W 12/06* (2013.01); *G06F 3/12* (2013.01); *G06F 3/1236* (2013.01)

(58) Field of Classification Search
CPC .... G06F 3/1238; G06F 3/1253; G06F 3/1285; G06F 21/335; G06F 21/42; G06F 3/12; G06F 3/1236; H04W 12/06
See application file for complete search history.

(56) References Cited

U.S. PATENT DOCUMENTS

| | | | |
|---|---|---|---|
| 10,607,123 B2* | 3/2020 | Okada | G06K 15/007 |
| 2014/0123240 A1 | 5/2014 | Seo et al. | |
| 2014/0223532 A1 | 8/2014 | Satoh | |
| 2015/0029536 A1* | 1/2015 | Suzuki | G06F 3/1288 358/1.14 |
| 2015/0341295 A1 | 11/2015 | Kato | |
| 2015/0370847 A1* | 12/2015 | Kondoh | G06F 17/40 707/691 |
| 2017/0149788 A1 | 5/2017 | Ohzaki et al. | |
| 2018/0121646 A1 | 5/2018 | Sakanashi et al. | |

* cited by examiner

COORDINATION SUPPORT SYSTEM, COORDINATION SUPPORT METHOD, AND NON-TRANSITORY COMPUTER-READABLE STORAGE MEDIUM

CROSS-REFERENCE TO RELATED APPLICATION

This patent application is based on and claims priority pursuant to 35 U.S.C. § 119(a) to Japanese Patent Application No. 2018-068920, filed on Mar. 30, 2018, in the Japan Patent Office, the entire disclosure of which is hereby incorporated by reference herein.

BACKGROUND

Technical Field

The present disclosure relates to a coordination support system, a coordination support method, and a non-transitory computer-readable storage medium.

Description of the Related Art

In recent years, models such as a cloud service attract attentions that provide a web application or a server-side application as a service. In addition, a system is known that links a plurality of the services.

For example, a system is known that configures a coordination setting for execution of link processing in advance and executes the link processing corresponding to the current coordination setting when a user logs in to the system via a device.

SUMMARY

According to an embodiment of the present disclosure, a coordination support system supports a coordination process of a plurality of services provided by a service providing apparatus. The coordination support system includes circuitry configured to: accept login information including user identification information and coordination identification information of the coordination process to be executed from a device; determine whether coordination setting for execution of the coordination process identified by the coordination identification information is configured; store an authentication ticket and a temporary token in association with each other based on a determination that the coordination setting is not configured, the authentication ticket indicating authentication of use of a function of the service providing apparatus executing the coordination process, and the temporary token indicating permission of use of the service providing apparatus; and transmit setting information including address information and the temporary token to a destination indicted by a communication address of a user identified by the user identification information, the address information indicating a storage location of a setting screen on which the coordination setting for the service providing apparatus is to be configured.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
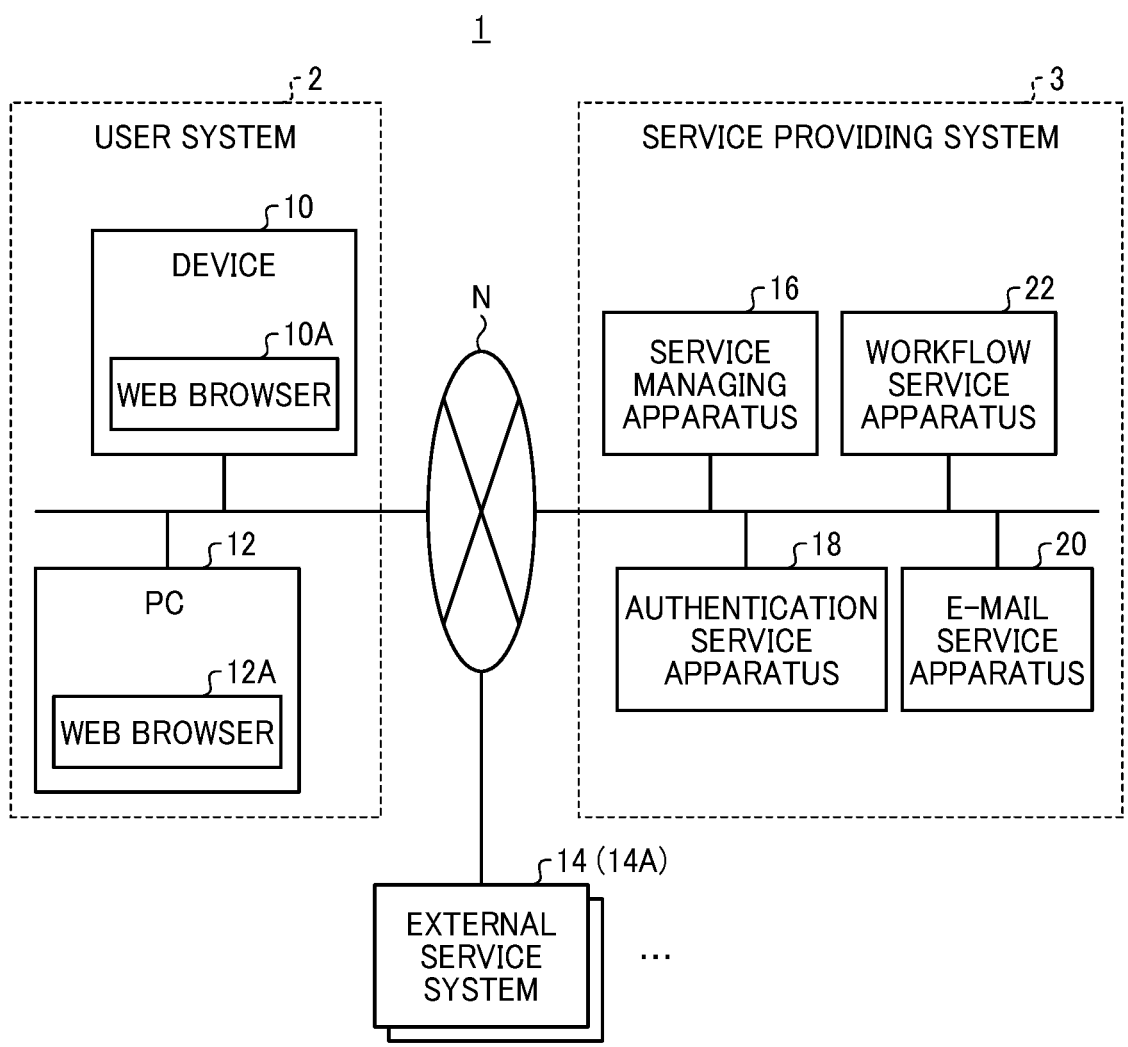
FIG. 1 is a diagram illustrating an example a configuration of a coordination support system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A detailed description is given of a coordination support system, a coordination support method, and a coordination support program according to an embodiment with reference to the accompanying drawings.

FIG. 1 is a configuration diagram of an example of a coordination support system 1 according to the present embodiment. The coordination support system 1 is a system supporting a coordination process of a plurality of services.

The coordination support system 1 includes a user system 2, a service providing system 3, and an external service system 14.

The user system 2, the service providing system 3, and the external service system 14 are connected via a network N.

The user system 2 is a system including various devices operated by a user. In the present embodiment, the user system 2 includes a device 10 and a personal computer (PC) 12.

The device 10 is a device executing various functions. Examples of the device 10 include a multifunction peripheral (MFP) having functions of a copier, a scanner, a printer, and the like, an electronic whiteboard, and a projector. In the present embodiment, a case where the device 10 is the MFP will be described as an example.

In the present embodiment, the device 10 includes a web browser 10A executed by a CPU or the like. A user who operates the device 10 can use services provided by the service providing system 3 and the external service system 14 via the web browser 10A.

The PC 12 is a device operated by the user. For example, the PC 12 is a known personal computer. The PC 12 may be a portable device. In this case, examples of the PC 12 include a mobile terminal, a tablet PC, a laptop PC, and a smartphone.

In the present embodiment, the PC 12 includes a web browser 12A executed by a CPU or the like. The user who operates the PC 12 can use the services provided by the service providing system 3 and the external service system 14 via the web browser 12A.

FIG. 1 illustrates a configuration in which the user system 2 includes one device 10 and one PC 12 as an example. In another example, the user system 2 includes the one or more devices 10 and the one or more PCs 12.

The external service system 14 is an example of a service providing apparatus. The external service system 14 is a system providing the various services such as known cloud services. For example, the external service system 14 provides a service of renting a storage area or the like. The external service system 14 provides resources stored in the external service system 14 and a service handling the resources.

The external service system 14 includes one or more service providing apparatuses 14A. The service providing apparatus 14A is an apparatus providing the service(s). A description will be provided hereinafter on the assumption that, in a case where the external service system 14 includes a plurality of the service providing apparatuses 14A, the plurality of the service providing apparatuses 14A provide different services from each other.

The service providing system 3 is a system providing a plurality of types of services. For example, the service providing system 3 provides a printing service, a scanning service, and an e-mail service. The printing service and the scanning service can be collectively referred to as an "MFP service".

In the present embodiment, a description is given of an example in which the service providing system 3 provides the plurality of types of services by a plurality of apparatuses including a service managing apparatus 16, an authentication service apparatus 18, an e-mail service apparatus 20, and a workflow service apparatus 22.

The service providing system 3 can be implemented by one information processing apparatus (a computer system).

It is assumed that, in the coordination support system 1, a standard technology called OAuth that is authorized by an application programming interface (API) is used. The service providing system 3 corresponds to a consumer of OAuth. The external service system 14 corresponds to a service provider (SP) of OAuth.

It is also assumed that the external service system 14 publishes a web API. Thus, the user can use the resources stored in the external service system 14 and the service handling the resources within his or her own authorization through the web API.

By using an authentication token that is based on the authorization delegated by the user, each of the apparatuses providing the services in the service providing system 3 can use the resources stored in the external service system 14 and the service handling the resources within a scope of the authorization delegated by the user.

Figure 2:
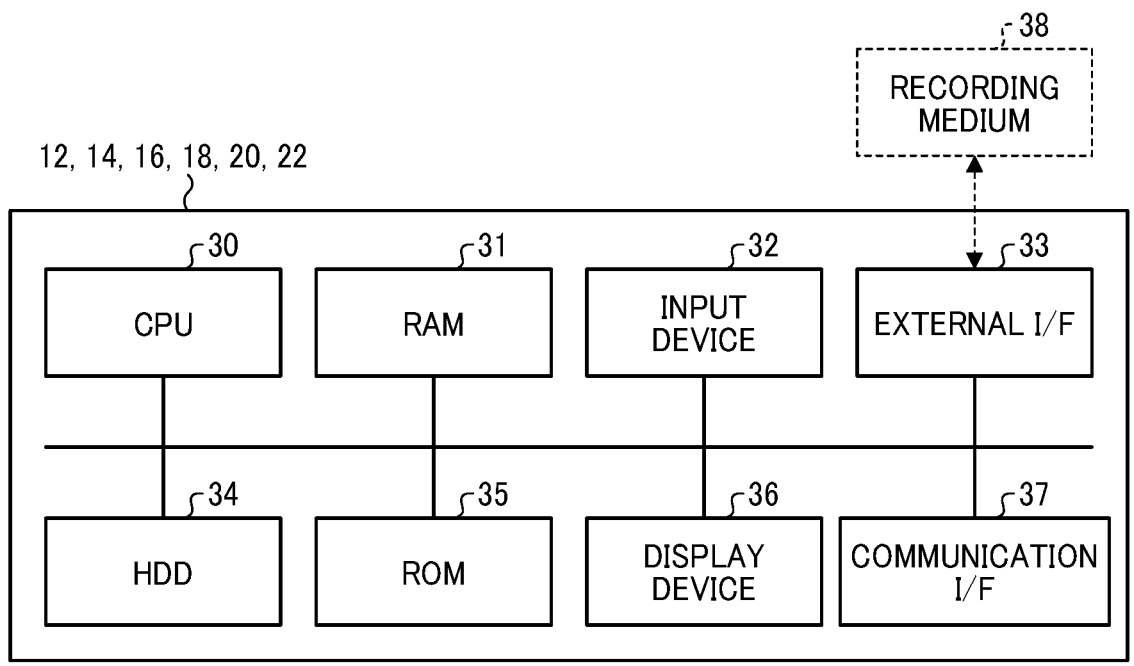
FIG. 2 is a block diagram illustrating an example of a hardware configuration, according to an embodiment of the present disclosure.

Next, a description is given of a hardware configuration. FIG. 2 is a block diagram illustrating an example of a hardware configuration of each of the PC 12, the external service system 14, the service managing apparatus 16, the authentication service apparatus 18, the e-mail service apparatus 20, and the workflow service apparatus 22. Each of the PC 12, the external service system 14, the service managing apparatus 16, the authentication service apparatus 18, the e-mail service apparatus 20, and the workflow service apparatus 22 includes an input device 32, a display device 36, an external interface (I/F) 33, a random access memory (RAM) 31, a read only memory (ROM) 35, a central processing unit (CPU) 30, a communication I/F 37, a hard disk drive (HDD) 34, and the like, which are mutually connected via a bus B.

The input device 32 includes a keyboard, a mouse, and a touchscreen and is used by the user to input each operation signal. The display device 36 includes a display and displays various information. The communication I/F 37 is an interface connected to the network N.

The HDD 34 is a non-volatile storage device storing programs and data. The stored programs and the stored data include an operating system (OS) as basic software, application software providing various functions on the OS; and the like.

The external I/F 33 is an interface with an external device. An example of the external device is a recording medium 38. Examples of the recording medium 38 are a flexible disk, a compact disk (CD), a digital versatile disk (DVD), a Secure Digital (SD) memory card, and a Universal Serial Bus (USB) memory stick.

Figure 3:
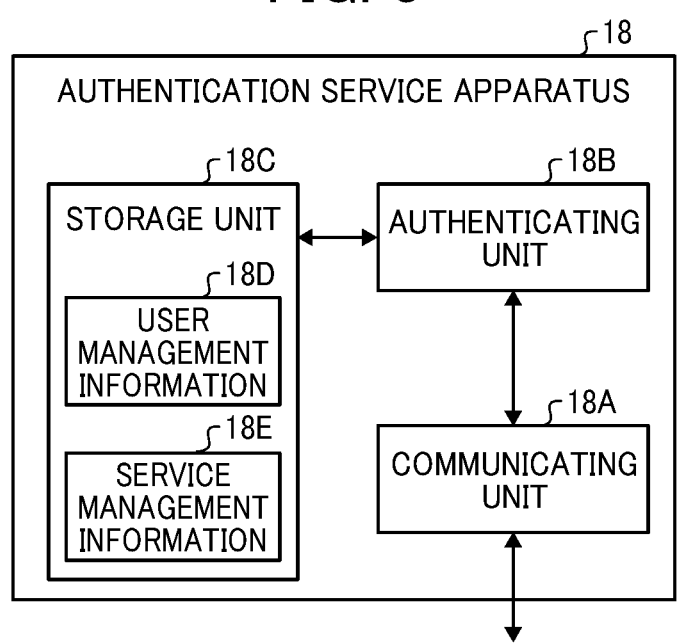
FIG. 3 is a block diagram illustrating an example of a functional configuration of an authentication service apparatus, according to an embodiment of the present disclosure.

Next, functions of the authentication service apparatus 18 will be described. FIG. 3 is a block diagram illustrating an example of a functional configuration of the authentication service apparatus 18. The authentication service apparatus 18 executes authentication on the basis of a login request from at least one of the device 10 and the PC 12. In addition, the authentication service apparatus 18 manages user information and information on the services. For example, the authentication service apparatus 18 includes a communicating unit 18A, an authenticating unit 18B, and a storage unit 18C. The communicating unit 18A communicates with other apparatuses via the network N.

The storage unit 18C stores various data. For example, the storage unit 18C stores user management information 18D and service management information 18E.

In the user management information 18D, a user ID, a password, and an organization ID are stored in association with each other. The user ID is user identification information. The organization ID is identification information of an organization to which the user belongs. In the present embodiment, the services provided by the service providing system 3 and the external service system 14 are managed by the organization ID. Thus, in the present embodiment, the organization ID functions as identification information of each of the services provided by the service providing system 3 and the external service system 14.

In the service management information 18E, a coordination ID, the organization ID, the user ID, a scope, and the authentication token are stored in association with each other.

The coordination ID is identification information identifying a coordination process of the plurality of the services. Examples of the coordination process include a coordination process of scanning a document and sending an e-mail of document data obtained by scanning, and a coordination process of scanning a document and storing the document data obtained by scanning in the external service system 14. Types of the coordination process are not limited to the above.

The scope is information that specifies a service range. By reading the scope, a service(s) of the external service system 14 required for a coordination process is specified. The scope can be information indicating a service range and authorization to execute the service indicated by the service range (for example, writing of a file to the external service system 14).

The authentication token is a token indicating permission to access to resources provided by the external service system 14 and the service handling the resources. Thus, when a given coordination process is identified by a coordination ID that is registered with an authentication token in the service management information 18E, it indicates that the coordination setting is configured for the given coordination process.

The authenticating unit 18B accepts login information from at least one of the device 10 and the PC 12 via the communicating unit 18A. When using a coordination service provided by the coordination support system 1, the user operates an operation panel 10G of the device 10 to input the login information. For example, the user operates the operation panel 10G to input the organization ID, the user ID, and the password. Then, the device 10 transmits the login information including the organization ID, the user ID, and the password to the authentication service apparatus 18. The authenticating unit 18B then accepts the login information.

Next, the authenticating unit 18B determines whether the user ID and the password included in the accepted login information are registered in association with each other in the user management information 18D. In a case where the user ID and the password are registered in association with each other in the user management information 18D, the authenticating unit 18B determines that the authentication is successful and issues an authentication ticket. Then, the authenticating unit 18B transmits the issued authentication ticket to one of the device 10 and the PC 12 as a transmission source of the login information via the communicating unit 18A.

The authentication ticket is information indicating that login to the coordination support system 1 is successful, and is information including the user ID of the user whose authentication is successful.

In addition, in response to accepting the authentication token, which indicates the permission of the access to the external service system 14 providing the service identified by the organization ID, from the external service system 14, the authenticating unit 18B stores the authentication token in the service management information 18E. Thus, when the authentication token is registered in association with a given service (scope) in the service management information 18E, it indicates that a coordination setting is configured for the given service.

Figure 4:
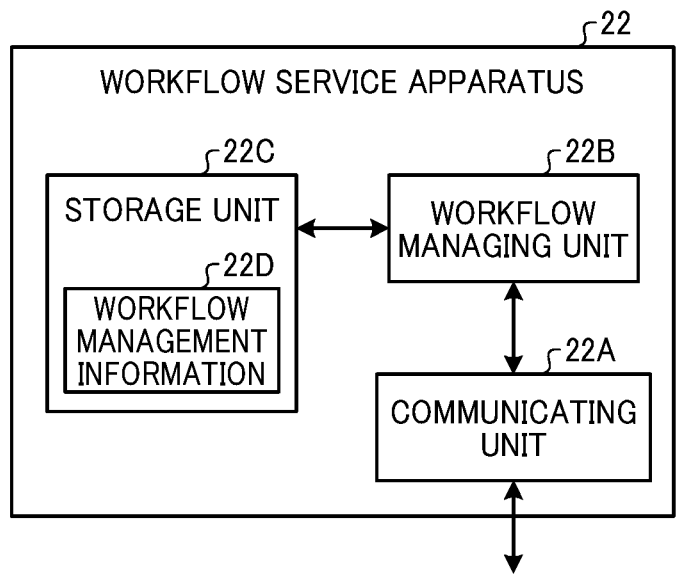
FIG. 4 is a block diagram illustrating an example of a functional configuration of a workflow service apparatus, according to an embodiment of the present disclosure.

Next, functions of the workflow service apparatus 22 will be described. FIG. 4 is a block diagram illustrating an example of a functional configuration of the workflow service apparatus 22. The workflow service apparatus 22 includes a communicating unit 22A, a workflow managing unit 22B, and a storage unit 22C. The communicating unit 22A communicates with other apparatuses via the network N.

The storage unit 22C stores various data. For example, the storage unit 22C stores workflow management information 22D. The workflow management information 22D is information in which the coordination ID, the organization ID, the user ID, and the scope are associated with each other.

As described above, the organization ID is identification information of the service. Thus, in the workflow management information 22D, one or more of the organization IDs are associated with the single coordination ID.

Figure 5:
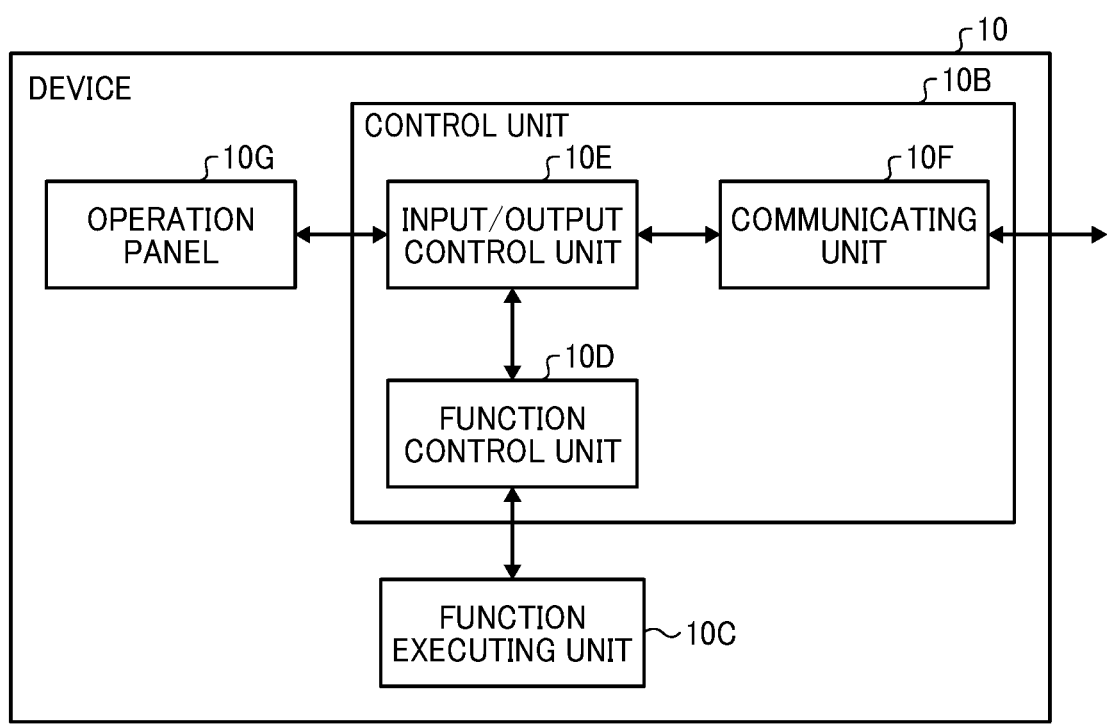
FIG. 5 is a block diagram illustrating an example of a functional configuration of a device, according to the embodiment of the present disclosure.

Next, an example of functions of the device 10 will be described. FIG. 5 is a block diagram illustrating an example of a functional configuration of the device 10. As described above, in the present embodiment, a case where the device 10 is the MFP will be described as the example.

The device 10 includes a control unit 10B, a function executing unit 10C, and the operation panel 10G. The operation panel 10G accepts various operation instructions from a user and displays various information. The operation panel 10G includes the above-described web browser 10A, for example.

The function executing unit 10C is an executing unit that executes functions of the copier, the scanner, the printer, and the like. The control unit 10B controls operation of the device 10. The control unit 10B includes a function control unit 10D, an input/output control unit 10E, and a communicating unit 10F.

The function control unit 10D controls operation of the function executing unit 10C. The communicating unit 10F communicates with various apparatuses via the network N.

The input/output control unit 10E is connected to the function control unit 10D and the communicating unit 10F such that they exchange data and signals with one another. The input/output control unit 10E controls input/output to/from the operation panel 10G and the function control unit 10D.

Figure 6:
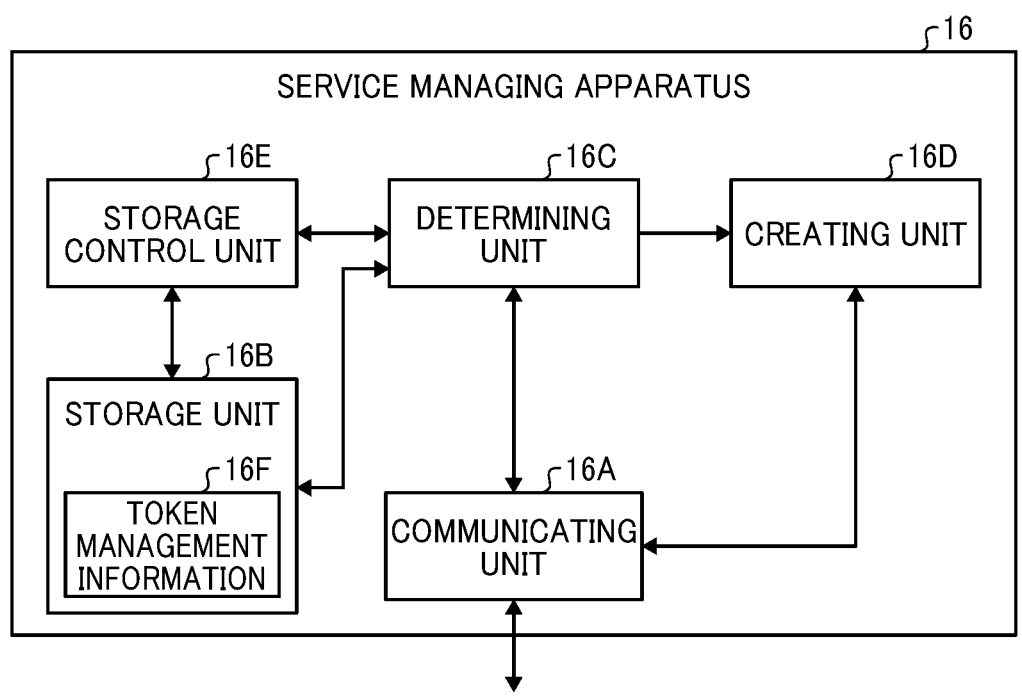
FIG. 6 is a block diagram illustrating an example of a functional configuration of a service managing apparatus, according to an embodiment of the present disclosure.

Next, an example of functions of the service managing apparatus 16 will be described. FIG. 6 is a block diagram illustrating an example of a functional configuration of the service managing apparatus 16.

The service managing apparatus 16 manages a session between the external service system 14 and at least one of the device 10 and the PC 12.

For example, the service managing apparatus 16 manages applications providing services of the functions (for example, printing, scanning, and the like) provided in the device 10. Such applications are installed in the service providing system 3. In the present embodiment, a case where such applications are installed in the service managing apparatus 16 will be described as an example. Each of such applications provides a service in cooperation with the service provided by the external service system 14 or the device 10, and thus can implement a coordination process. In this case, the service managing apparatus 16 obtains the authentication token for the access to the external service system 14 from the external service system 14, and thus can access the external service system 14 to implement the coordination process.

In addition, the service managing apparatus 16 manages information indicating which service range (scope) of the external service system 14 is to be linked in order to execute each of the above applications.

The service managing apparatus 16 includes a communicating unit 16A, a storage unit 16B, a determining unit 16C, a creating unit 16D, and a storage control unit 16E, for example. The communicating unit 16A communicates with other apparatuses via the network N. The storage unit 16B stores various data.

The communicating unit 16A of the service managing apparatus 16 is an example of an accepting unit. In the present embodiment, the communicating unit 16A accepts the login information including the user ID from the device 10.

In the present embodiment, the communicating unit 16A accepts external coordination setting checking information from the device 10. The external coordination setting checking information includes the authentication ticket that is issued when the authentication service apparatus 18 determines that the authentication of the login information accepted from the device 10 is successful.

The communication unit 16A of the service managing apparatus 16 also accepts the coordination ID (coordination identification information) from the device 10. In the present embodiment, for example, the device 10 displays a display screen displaying a list of coordination processes on the operation panel 10G. The list includes the coordination processes that can be provided or are planned to be provided by the coordination support system 1. The user operates the operation panel 10G to instruct a coordination process to be executed. Then, the device 10 transmits the coordination ID of the coordination process, which is instructed, to the service managing apparatus 16.

The determining unit 16C determines whether the coordination setting for the execution of the coordination process, which is identified by the coordination ID, is configured.

In the present embodiment, the determining unit 16C communicates with the authentication service apparatus 18 and the workflow service apparatus 22 to make the determination.

More specifically, the determining unit 16C transmits the authentication ticket, which is accepted from the device 10, and the coordination ID of the coordination process to be executed to the workflow service apparatus 22. The workflow managing unit 22B of the workflow service apparatus 22 identifies the scope, which is included in the workflow management information 22D and corresponds to the coordination ID accepted from the service managing apparatus 16, so as to check the service for the coordination process identified by the coordination ID.

Then, the workflow managing unit 22B transmits the identified scope to the service managing apparatus 16.

The determining unit 16C of the service managing apparatus 16 analyzes the scope accepted from the workflow service apparatus 22. As described above, the scope is information indicating the service range. Thus, the determining unit 16 C analyzes the scope to identify a plurality of services required for the coordination process to be executed.

Next, the determining unit 16C of the service managing apparatus 16 determines whether the coordination settings are configured for the plurality of the services that are identified as being required for the coordination process to be executed. In the present embodiment, the determining unit 16C transmits the accepted scope to the authentication service apparatus 18.

The authenticating unit 18B of the authentication service apparatus 18 determines whether the authentication token that corresponds to the scope accepted from the service managing apparatus 16 is registered in the service management information 18E. In a case where the authentication token is registered, the coordination support system 1 executes the coordination process to be executed.

By contrast, in a case where the authentication token, which corresponds to the scope accepted from the service managing apparatus 16, is not registered in the service management information 18E, the authenticating unit 18B of the authentication service apparatus 18 determines that the coordination setting is not configured for the execution of the coordination process to be executed. Then, the authenticating unit 18B transmits a determination result to the service managing apparatus 16.

In response to accepting the determination result indicating that the coordination setting is not configured from the authentication service apparatus 18, the determining unit 16C of the service managing apparatus 16 determines that the coordination setting is not configured.

Based on the determination that the coordination setting is not configured, the determining unit 16C transmits a request to issue a temporary token to the authentication service apparatus 18. The temporary token indicates permission of use of the external service system 14 that executes the coordination process to be executed. Then, the determining unit 16C accepts the temporary token, which is temporarily issued by the authenticating unit 18B of the authentication service apparatus 18, from the authentication service apparatus 18.

The storage control unit 16E of the service managing apparatus 16 stores the temporary token, which is accepted by the determining unit 16C, with the authentication ticket, which is accepted from the device 10, in token management information 16F of the service managing apparatus 16. As a result, in the token management information 16F, the authentication ticket and the temporary token are registered in association with each other.

The creating unit 16D creates setting information including the temporary token and address information indicating a storage location of a setting screen for configuring the coordination setting for the external service system 14 that provides services provided by the coordination process to be executed.

In the present embodiment, it is assumed that the storage location of the setting screen for configuring the coordination setting is a specific area in the storage unit 16B of the service managing apparatus 16.

The address information indicating the storage location of the setting screen for configuring the coordination setting is represented by a Uniform Resource Locator (URL), for example. The address information is not limited to an URL. In the present embodiment, a case where the address information is represented by an URL will be described as an example.

The setting screen is a setting screen on which the coordination setting is configured. Examples of the coordination setting include settings of the services executing the coordination process, a setting of an order of the coordination process by the plurality of the services, and a setting of the authentication token provided by the external service system 14, which provides the service executing the coordination process. The authentication token is issued after the coordination support system 1 transmits the request to issue the authentication token to the corresponding external service system 14 in accordance with the service displayed on the setting screen.

As described above, the creating unit 16D creates the setting information including the URL and the temporary token. In another example, the creating unit 16D creates the address information (the URL) including the authentication token. For example, the creating unit 16D creates the address information with the authentication token being added at an end of the address information. In this case, the creating unit 16D creates the setting information (the URL) indicating the storage location of the setting screen and the temporary token.

Next, the communicating unit 16A transmits the setting information, which is created by the creating unit 16D, to a destination indicated by a communication address of the user identified by the user ID included in the login information.

For example, the user ID and the communication address of the user identified by the user ID, are associated with each other and stored in the storage unit 16B in advance. The communication address is an e-mail address, for example.

In the present embodiment, an example case in which the communication address is an e-mail address is described. Thus, the communicating unit 16A transmits e-mail text in which the URL is written to the e-mail address. More specifically, the e-mail text is transmitted to the e-mail address via the e-mail service apparatus 20.

The user receives the e-mail by the PC 12, for example. Then, the user makes an operation to select the URL written in the e-mail text. In response to this operation, the PC 12 accesses the storage unit 16B of the service managing apparatus 16, which is the storage location indicated by the URL, and transmits the temporary token set in the URL to the service managing apparatus 16.

In response to receiving the temporary token from the PC 12 via the communicating unit 16A, the determining unit 16C of the service managing apparatus 16 reads the authentication ticket, which corresponds to the received temporary token, from the token management information 16F. Thus, the user who operates the PC 12 can cause the service managing apparatus 16 to identify the authentication ticket without logging in to the coordination support system 1 again.

In other words, the service managing apparatus 16 idenifies the authentication ticket by reading the authentication ticket that corresponds to the temporary token accepted from the PC 12 from the token management information 16F, instead of identifying the authentication ticket that is issued again by the authentication service apparatus 18 in accordance with the login information accepted from the PC 12.

Then, the communicating unit 16A of the service managing apparatus 16 transmits the identified authentication ticket to the web browser 12A of the PC 12. Thus, the service managing apparatus 16 and the PC 12 can treat the web browser 12A of the PC 12 as having already logged in to the coordination support system 1.

Then, the coordination support system 1 accepts an operation for the coordination setting from the PC 12. To enable the coordination support system 1 to execute the coordination process by using the external service system 14 and OAuth, the API is to be called in advance.

For this reason, the web browser 12A of the PC 12 performs API reading to the authentication service apparatus 18. Then, the authentication service apparatus 18 performs API reading to the external service system 14. As a result, the URL of the setting screen of the coordination process is replied from the external service system 14. The authentication service apparatus 18 redirects (instructs) the PC 12 to display the setting screen indicated by the LTRL by using the web browser 12A. Then, the PC 12 displays the setting screen.

The user operates the PC 12 while referring to the setting screen, to configure the coordination setting. For example, it is assumed that the coordination process to be executed is a coordination process of scanning a document and store document data obtained by the scanning in the service providing apparatus 14A (for example, a specific server apparatus). In this case, for example, a screen including character information of "The application AA requests the authorization of YY. Do you permit?" is displayed on the PC 12 as the setting screen of the service providing apparatus 14A. The user operates the PC 12 in accordance with the displayed instruction. As a result, the authentication token is stored in the service management information 18E of the authentication service apparatus 18 in association with the coordination ID of the coordination process to be executed.

Figure 7:
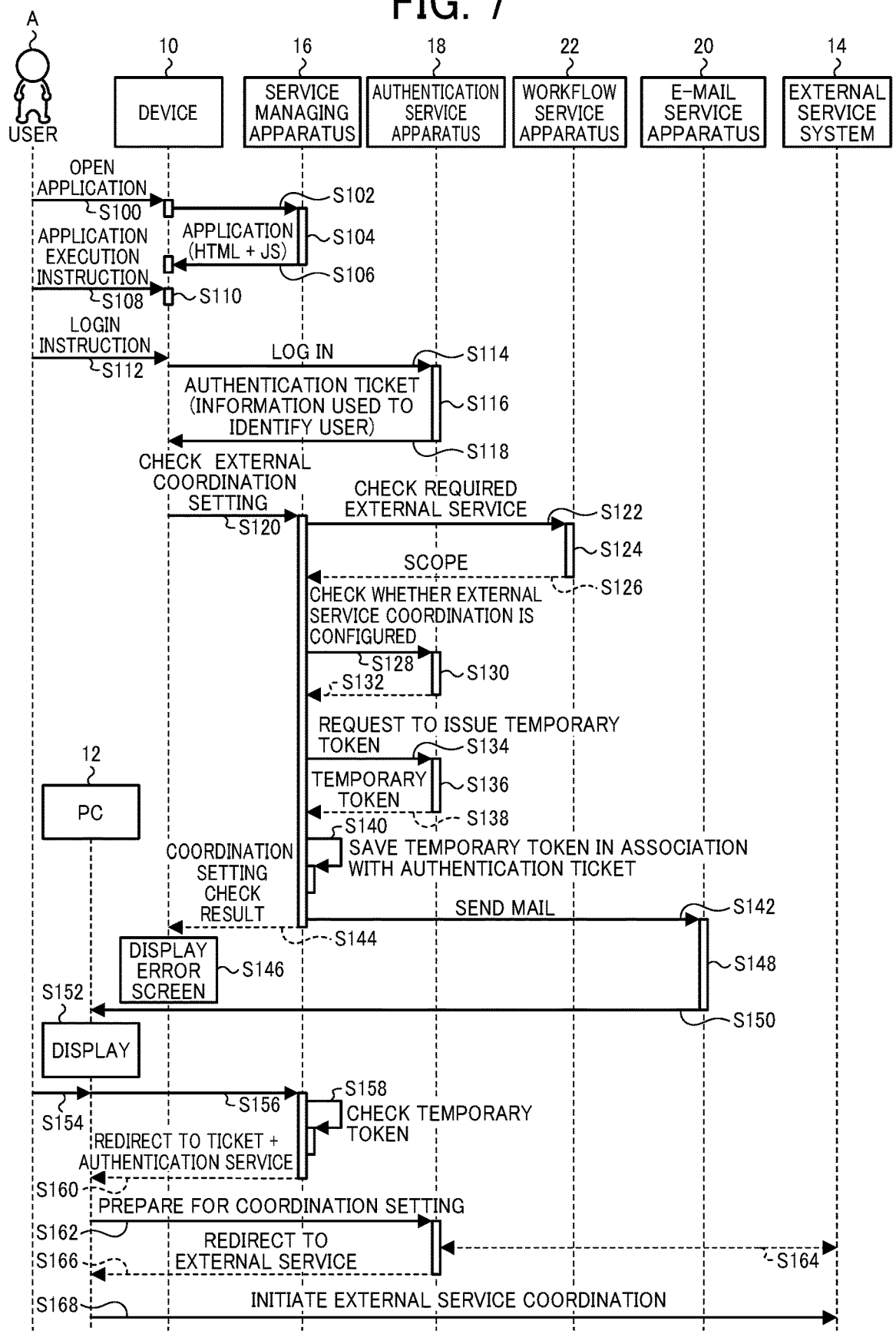
FIG. 7 is a sequence diagram illustrating an example of a flow of coordination support operation, according to an embodiment of the present disclosure.

Next, a description is given of an example of a flow of coordination support processing executed in the coordination support system 1. FIG. 7 is a sequence diagram illustrating an example of the flow of the coordination support processing executed by the coordination support system 1 according to the present embodiment.

First, a user A operates the operation panel 10G of the device 10 to instruct reading of a web page, so as to input an application execution instruction (step S100). When the web browser 10A of the device 10 executes JavaScript® in the web page, the device 10 displays the web page (step S102, step S104, and step S106).

Figure 8:
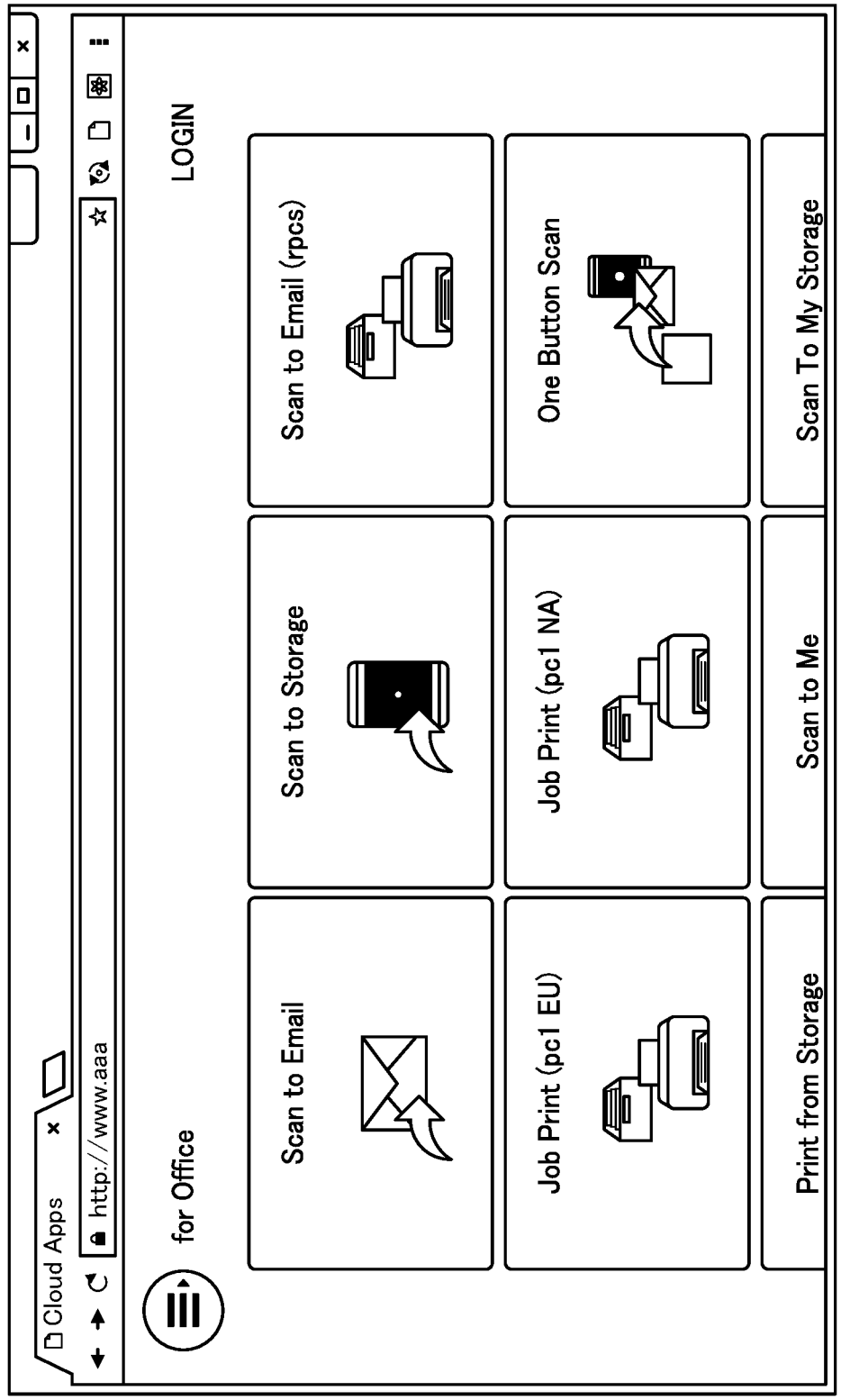
FIG. 8 is an illustration of an example of a display screen, according to an embodiment of the present disclosure.

Next, the user A operates the operation panel 10G of the device 10 to input the application execution instruction for executing the MFP service (step S106). The web browser 10A of the device 10 displays a display screen 80 as illustrated in FIG. 8, for example. The display screen 80 is a screen displaying a list of coordination processes. The user A selects a desired coordination process to be executed among the coordination processes displayed on the display screen 80. Then, the device 10 displays a login screen on the operation panel 10G (step S108).

The user A inputs the organization ID, the user ID, and the password via the login screen (step S110). Then, the device 10 transmits the login information including the input organization ID, the input user ID, and the input password to the authentication service apparatus 18 (step S112). In one example, a PIN code is used as the password.

The authenticating unit 18B of the authentication service apparatus 18 determines whether the user ID and the password, which are included in the login information accepted from the device 10, are registered in association with each other in the user management information 18D (step S114). In a case where the user ID and the password are registered in association with each other in the user management information 18D, the authenticating unit 18B determines that the authentication is successful, issues the authentication ticket, and transmits the authentication ticket to the device 10 as a transmission source of the login information (step S118).

Next, the device 10 transmits external coordination setting checking information including the authentication ticket received in step S118 and the coordination ID of the coordination process to be executed to the service managing apparatus 16 (step S120).

Referring again to FIG. 7, the determining unit 16C of the service managing apparatus 16 transmits the authentication ticket, which is accepted from the device 10, and the coordination ID of the coordination process to be executed to the workflow service apparatus 22 (step S122). By the processing of step S122, the service managing apparatus 16 transmits a request to check the required external services to the workflow service apparatus 22.

The workflow managing unit 22B of the workflow service apparatus 22 identifies a scope that is included in the workflow management information 22D and corresponds to the coordination ID accepted from the service managing apparatus 16 in step S122, to check the services required for the coordination process identified by the coordination ID (step S124).

Then, the workflow managing unit 22B transmits the identified scope to the service managing apparatus 16 (step S126).

Next, the determining unit 16C of the service managing apparatus 16 determines whether the coordination setting has been configured for the plurality of the services that are identified to be required for the coordination process to be executed. In the present embodiment, the determining unit 16C transmits the accepted scope to the authentication service apparatus 18 (step S128).

The authenticating unit 18B of the authentication service apparatus 18 determines whether the authentication token that corresponds to the scope accepted from the workflow service apparatus 22 is registered in the service management information 18E (step S130). When the authentication token is registered, the coordination support system 1 executes the coordination process to be executed.

By contrast, when the authentication token that corresponds to the scope accepted from the service managing apparatus 16 is not registered in the service management information 18E, the authenticating unit 18B of the authentication service apparatus 18 determines that the coordination setting for the execution of the coordination process to be executed is not configured. In the following, a description is given of an example in which the coordination setting is not configured.

Then, the authenticating unit 18B transmits a determination result indicating that the coordination setting is not configured to the service managing apparatus 16 (step S132).

In response to accepting the determination result indicating that the coordination setting is not configured from the authentication service apparatus 18, the determining unit 16C of the service managing apparatus 16 determines that the coordination setting is not configured.

Based on the determination that the coordination setting is not configured, the determining unit 16C transmits a request to issue a temporary token to the authentication service apparatus 18 (step S134). The temporary token indicates permission of the use of the external service system 14 that executes the coordination process to be executed. Then, the determining unit 16C accepts the temporary token, which is temporarily issued by the authenticating unit 18B of the authentication service apparatus 18, from the authentication service apparatus 18 (step S136 and step S138).

The storage control unit 16E of the service managing apparatus 16 stores the temporary token, which is accepted by the determining unit 16C, in association with the authentication ticket, which is accepted from the device 10, in the token management information 16F of the service managing apparatus 16 (step S140). Thus, in the token management information 16F, the authentication ticket and the temporary token are registered in association with each other.

The creating unit 16D of the service managing apparatus 16 creates setting information (an URL) including the temporary token and address information indicating a storage location of a setting screen on which the coordination setting for the external service system 14 providing services provided by the coordination process to be executed is to be configured (step S140). Although an example case in which the URL is created as the information including the setting information, the information including the setting information is not limited to the URL. In another example, information, such as a two-dimensional barcode, corresponding to the URL is created.

Figure 9:
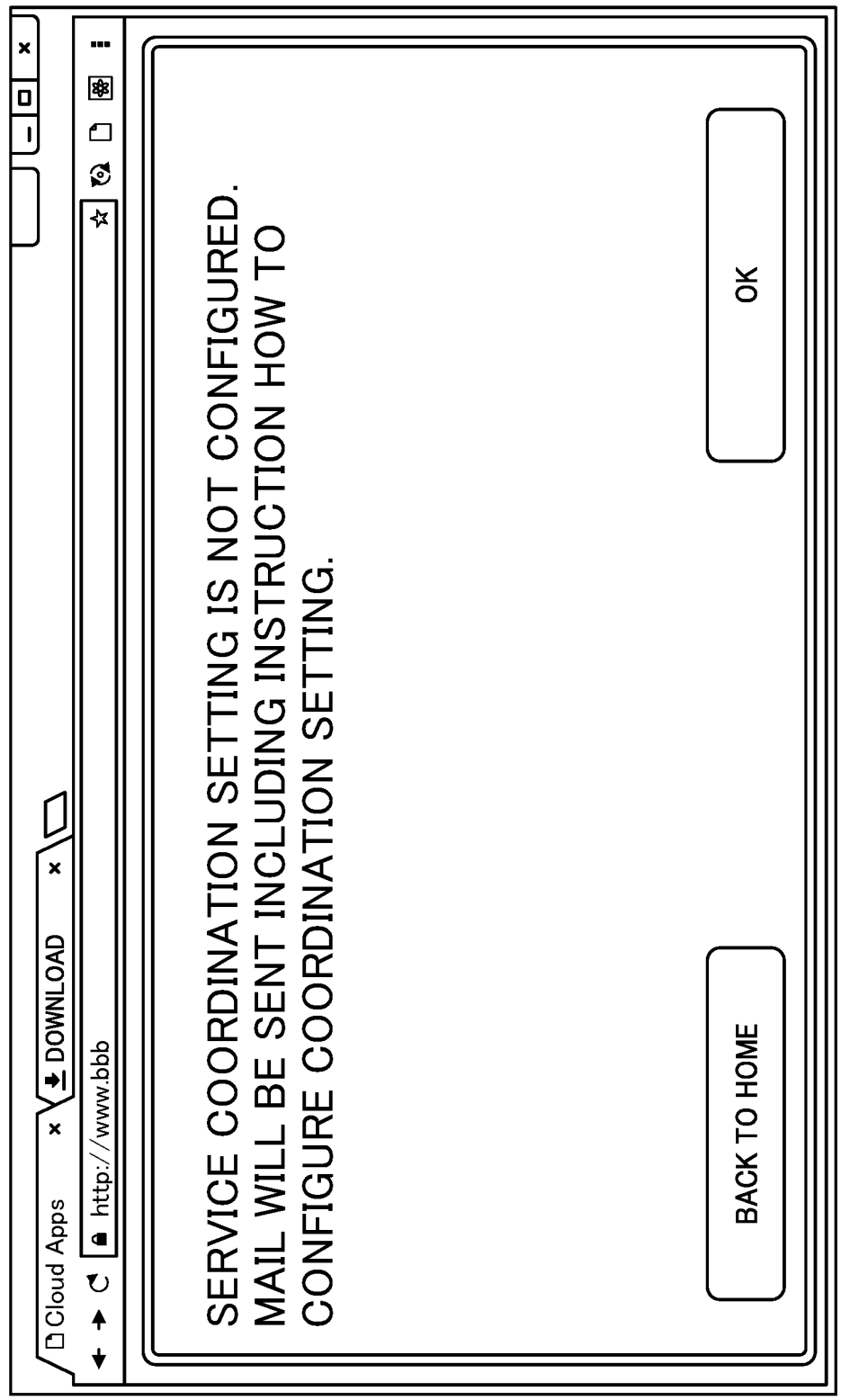
FIG. 9 is an illustration of another example of the display screen, according to an embodiment of the present disclosure.

Then, the communicating unit 16A of the service managing apparatus 16 transmits a coordination setting checking result indicating that the coordination setting is not configured to the device 10 (step S144). The web browser 10A of the device 10 displays a display screen 81 as illustrated in FIG. 9, for example (step S146). The display screen 81 is a screen indicating that the coordination setting is not configured.

Referring again to FIG. 7, the communication unit 16A of the service managing apparatus 16 transmits the setting information (the URL), which is generated in step S140, to a destination indicated by the communication address of the user identified by the user LID included in the login information in step S112 via the e-mail service apparatus 20 (step S142, step S148, and step S150). Although an example case in which an electronic mail service is used for transmitting the setting information (the URL) is described, the setting information (the URL) can be transmitted in any suitable way other than the electronic mail service. For example, a short message service or a social networking service (SNS) will suffice, provided that it can transmit the URL.

In the present embodiment, the PC 12 operated by the user A receives the e-mail. Then, the web browser 12A of the PC 12 displays a screen of the e-mail (step S152).

Figure 10:
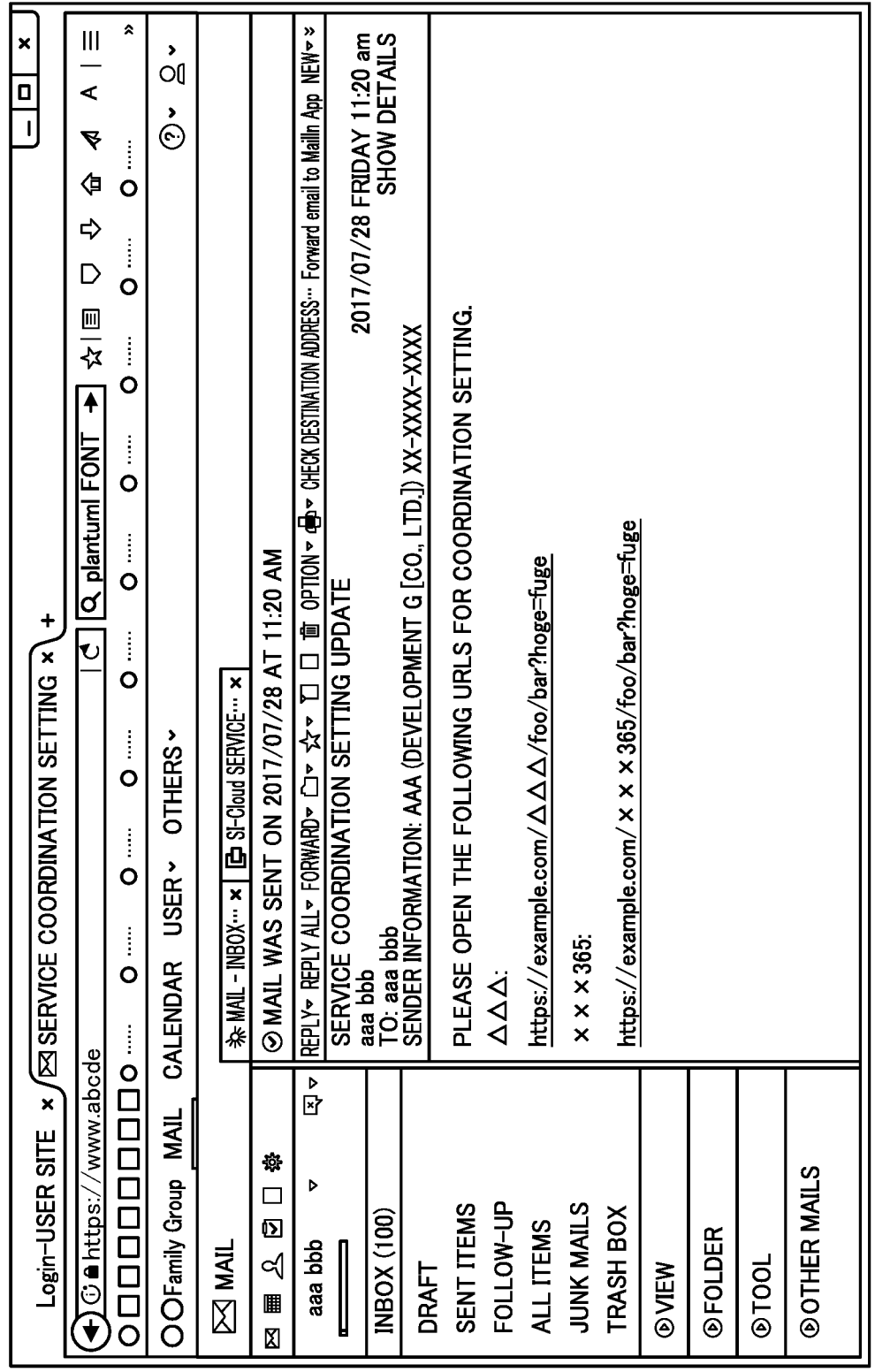
FIG. 10 is an illustration of still another example of the display screen, according to an embodiment of the present disclosure.

FIG. 10 is an illustration of an example of a display screen 82 that is displayed. As illustrated in FIG. 10, the display screen 82 including e-mail text including the URL is displayed on the device 10.

As illustrated in FIG. 10, the display screen 82 is a screen, for example, including a plurality of the URLs (that is, a plurality of pieces of location information). In this case, the communication unit 16A of the service managing apparatus 16 transmits the setting information (the URLs) including a plurality of pieces of the address information and a plurality of the temporary tokens used to access a plurality of the setting screens for configuring a plurality of the coordination settings to a destination indicated by the communication address of the user.

Referring again to FIG. 7, the user A selects the URL indicated in the e-mail (step S154). Then, the web browser 12A of the PC 12 accesses the storage unit 16B of the service managing apparatus 16 that is the storage location indicated by the URL, and transmits the temporary token, which is set for the URL, to the service managing apparatus 16 (step S156).

In response to receiving the temporary token from the PC 12 via the communicating unit 16A, the determining unit 16C of the service managing apparatus 16 reads the authentication ticket corresponding to the received temporary token from the token management information 16F (step S158). Thus, the user who operates the PC 12 can cause the service management apparatus 16 to identify the authentication ticket without logging in to the coordination support system 1 again.

In other words, the service managing apparatus 16 identifies the authentication ticket by reading, from the token management information 16F, the authentication ticket associated with the temporary token accepted from the PC 12, instead of identifying the authentication ticket, which is issued again by the authentication service apparatus 18 in accordance with the login information accepted from the PC 12.

Then, the communicating unit 16A of the service managing apparatus 16 transmits the identified authentication ticket to the web browser 12A of the PC 12 (step S160). Thus, the service managing apparatus 16 and the PC 12 can treat the web browser 12A of the PC 12 as having already logged in to the coordination support system 1.

Next, the web browser 12A of the PC 12 performs API reading to the authentication service apparatus 18 (step S162). Then, the authentication service apparatus 18 performs API reading to the external service system 14, and thus the URL of the setting screen of the coordination process is replied from the external service system 14 (step S164). The authentication service apparatus 18 redirects the PC 12 to display the setting screen indicated by the returned URL by using the web browser 12A (step S166).

Figure 11:
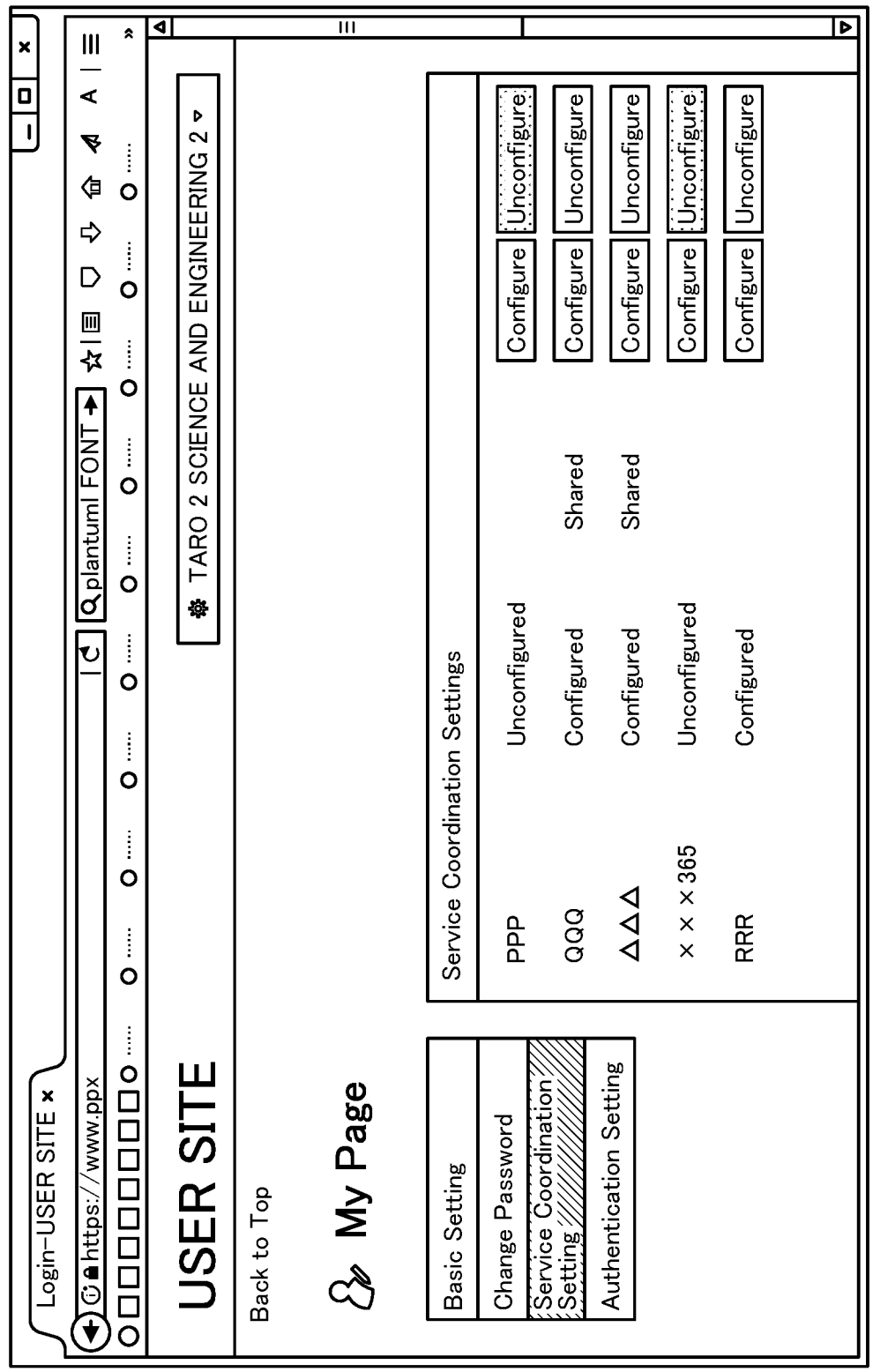
FIG. 11 is an illustration of an example of a setting screen, according to an embodiment of the present disclosure.

As a result, the setting screen is displayed on the PC 12. FIG. 11 is an illustration of an example of a setting screen 84.

Referring again to FIG. 7, the user A operates the PC 12 while referring to the setting screen 84, to configure the coordination setting (step S168). For example, it is assumed that the coordination process to be executed is a coordination process of scanning a document and storing document data obtained by the scanning in the service providing apparatus 14A (for example, a specific server apparatus). In this case, for example, the screen including the character information, "The application AA requests the authorization of YY. Do you permit?", is displayed on the PC 12 as the setting screen of the service providing apparatus 14A. The user A operates the PC 12 in accordance with the displayed instruction. As a result, the authorization token is stored in the service management information 18E of the authentication service apparatus 18 in association with the coordination ID of the coordination process to be executed. Then, the present sequence ends.

As described so far, the coordination support system 1 according to the present embodiment is a coordination support system that supports a coordination process of the plurality of services provided by a service providing apparatus (the service providing apparatus 14A, the service managing apparatus 16, the authentication service apparatus 18, the e-mail service apparatus 20, and the workflow service apparatus 22). The coordination support system 1 includes an accepting unit (the communicating unit 16A), the determining unit 16C, the storage control unit 16E, and a transmitting unit (the communicating unit 16A). The accepting unit (the communicating unit 16A) accepts login information, which includes user identification information (the user ID) and coordination identification information (the coordination ID) of the coordination process to be executed from the device 10. The deter mining unit 16C deter mines whether a coordination setting for execution of the coordination process that is identified by the coordination identification information (the coordination ID) is configured. In a case where the determining unit 16C determines that the coordination setting is not configured, the storage control unit 16E stores an authentication ticket, which indicates authentication of use of functions of the service providing apparatus performing the coordination process, and a temporary token, which indicates permission of the use of the service providing apparatus, in association with each other. The transmitting unit (the communicating unit 16A) transmits setting information (an URL) including the temporary token and address information, which indicates a storage location of a setting screen on which the coordination setting for the service providing apparatus is to be configured to a destination indicated by a communication address (the e-mail address) of a user identified by the user identification information (the user ID).

Just as described, in a case where the coordination setting for the execution of the coordination process is not configured, the coordination support system 1 according to the present embodiment stores the authentication ticket in association with the temporary token. Thus, the coordination support system 1 no longer requires the user, who operates the device 10, to perform such an operation that the user logs in to the coordination support system 1 again by using another device (for example, the PC 12) and then configures the coordination setting. In other words, the coordination support system 1 accepts the temporary token, which is transmitted to the communication address of the user, and identifies the authentication ticket corresponding to the temporary token. As a result, the coordination support system 1 can accept the coordination setting without obtaining the user's login information from the PC 12.

Thus, even in a case where the coordination setting for the coordination process to be executed is not configured in the coordination support system 1, the user can configure the coordination setting without logging in to the coordination support system 1 again by using the PC 12, which differs from the device 10 to which the user logs in.

Therefore, the coordination support system 1 according to the present embodiment can improve convenience.

On the other hand, in the related art, in a case where the user logs in to the coordination support system 1 via the device 10 in a state where the coordination setting is not configured, the user has to additionally log in to the coordination support system 1 by using another device (for example, the PC 12) for configuring the coordination setting and then configure the coordination setting.

Figure 12:
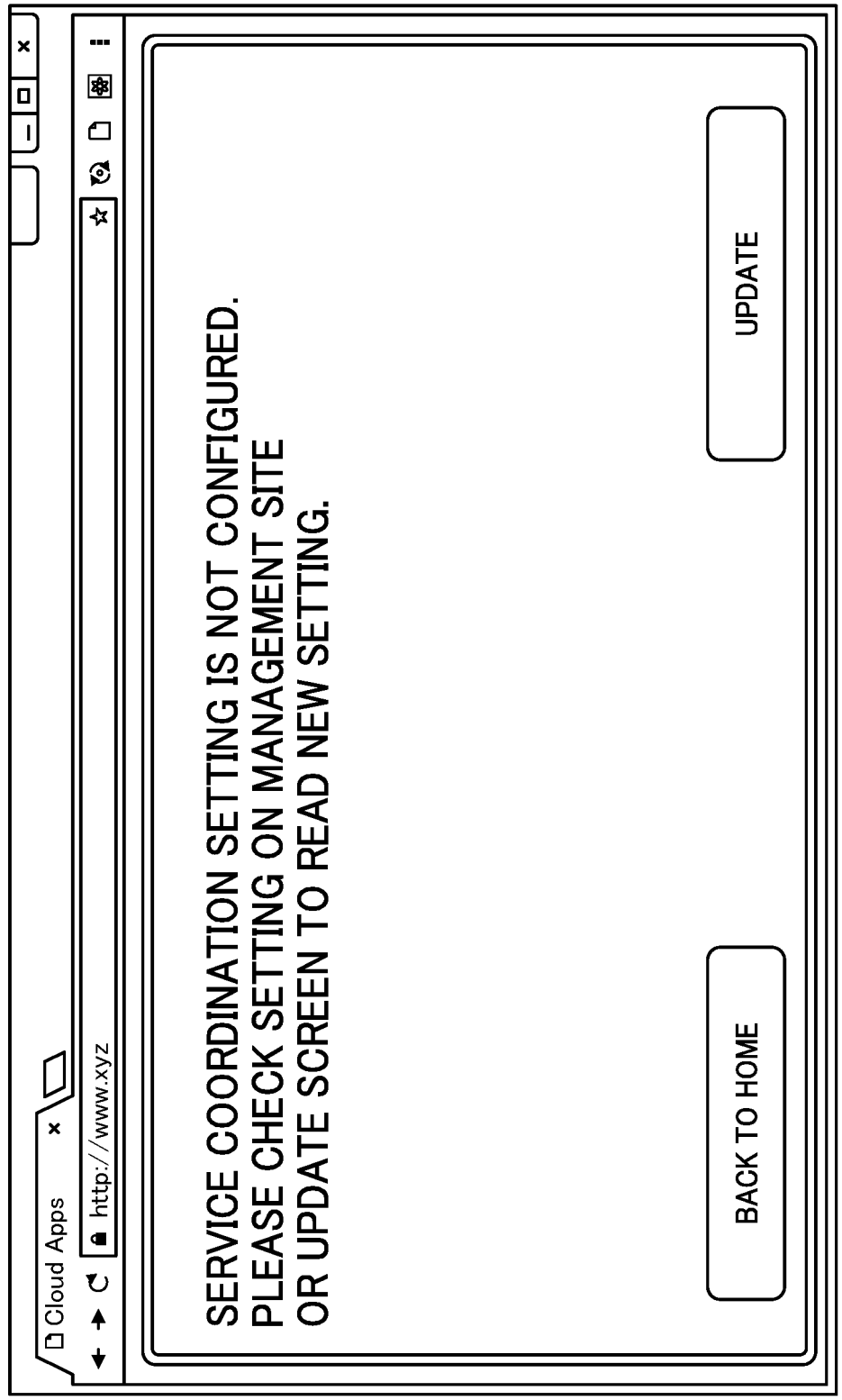
FIG. 12 is an illustration of a comparative example of a display screen, according to the related art.
Figure 13:
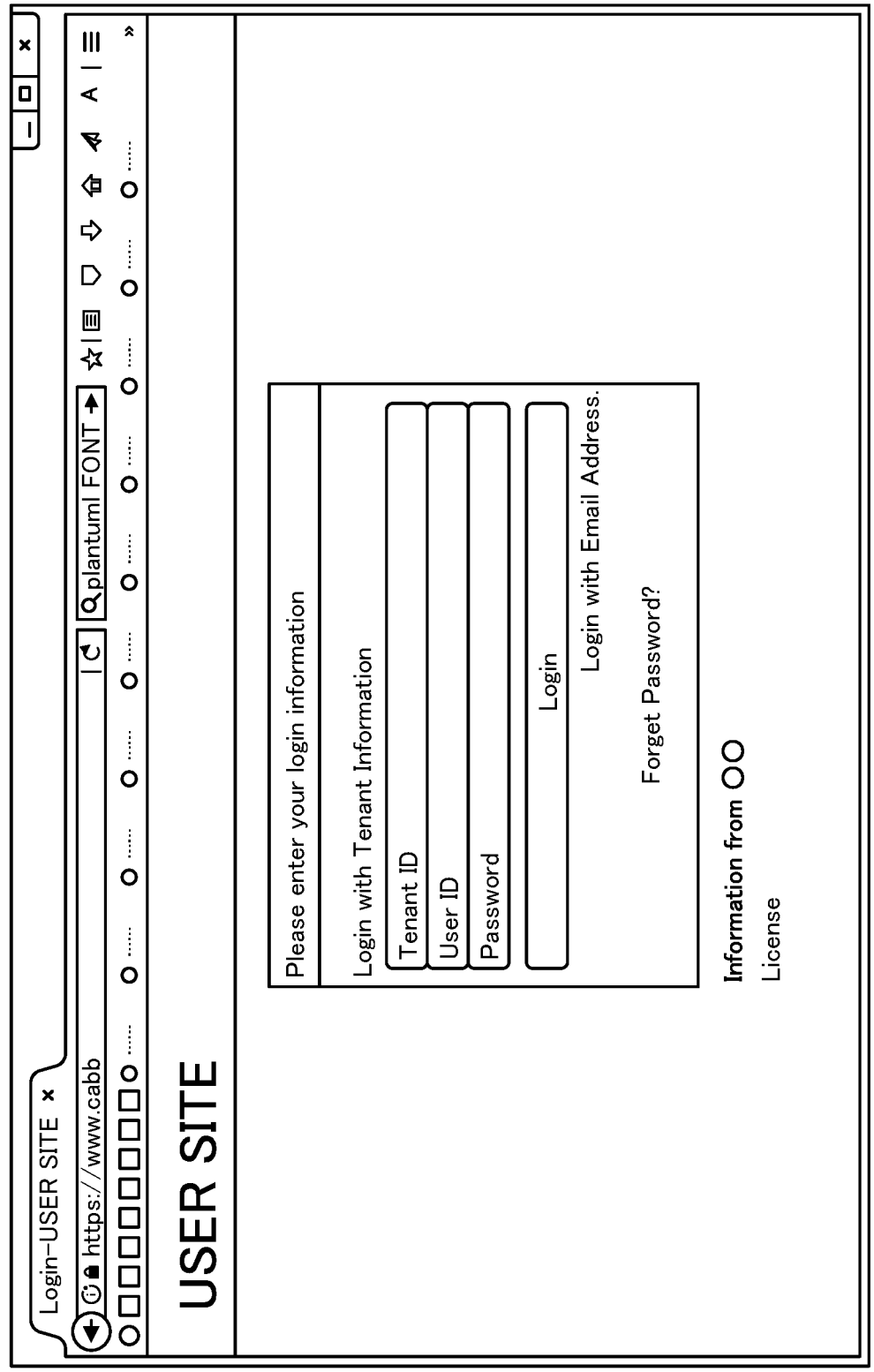
FIG. 13 is an illustration of another comparative example of the display screen, according to the related art.

FIG. 12 and FIG. 13 are illustrations of an example of a transition of display screens according to the related art. For example, it is assumed that the web browser 10A of the device 10 displays the display screen 80 as illustrated in FIG. 8 to a user who has logged in to the coordination support system 1 by using the device 10. It is also assumed that the user then selects the coordination process to be executed among the coordination processes displayed on the display screen 80. Furthermore, it is assumed that the coordination setting for the selected coordination process is not configured.

In this case, in the related art, a comparative display screen 800 as illustrated in FIG. 12 is displayed on the device 10. To configure the coordination setting, the user has to additionally log in to the coordination support system 1 from another device (for example, the PC 12) and configure the coordination setting.

Thus, in the related art, the user has to additionally log in to the coordination support system 1 from the other device used for the coordination setting and configure the coordination setting, which degrades convenience.

By contrast, with the unique configuration described above, the coordination support system 1 according to the present embodiment can improve convenience.

In addition, as described above, the communicating unit 16A can transmit the setting information (URLs), which includes a plurality of pieces of the address information and a plurality of the temporary tokens used to access a plurality of the setting screens for configuring a plurality of the coordination settings, to a destination indicated by the communication address (the mail address) of the user.

This allows the user to configure the plurality of the coordination settings by checking one e-mail without opening a plurality of e-mails.

A coordination support method according to the present embodiment is a coordination support method performed by the coordination support system 1 that supports a coordination process of a plurality of services provided by service providing apparatuses (the service providing apparatus 14A, the service managing apparatus 16, the authentication service apparatus 18, the e-mail service apparatus 20, and the workflow service apparatus 22). The coordination support method according to the present embodiment includes: accepting login information including user identification information (the user ID) and coordination identification information (the coordination ID) of the coordination process to be executed from the device 10; determining whether a coordination setting for execution of the coordination process identified by the coordination identification information (the coordination ID) is configured; storing an authentication ticket, which indicates authentication of use of functions of the service providing apparatus executing the coordination process, and a temporary token, which indicates permission of the use of the service providing apparatus, in association with each other based on a determination that the coordination setting is not configured; and transmitting setting information (the URL) including the temporary token and address information, which indicates a storage location of a setting screen on which the coordination setting for the service providing apparatus is to be configured to a destination indicated by an communication address (the e-mail address) of a user identified by the user identification information (the user ID).

In addition, a coordination support program according to the present embodiment is a coordination support program performed by the coordination support system 1 that supports a coordination process of a plurality of services provided by a service providing apparatus (the service providing apparatus 14A, the service managing apparatus 16, the authentication service apparatus 18, the e-mail service apparatus 20, and the workflow service apparatus 22). The coordination support program according to the present embodiment causes a computer to execute: accepting login information including user identification information (the user ID) and coordination identification information (the coordination ID) of the coordination process to be executed from the device 10; determining whether a coordination setting for execution of the coordination process identified by the coordination identification information (the coordination ID) is configured; storing the authentication ticket, which indicates the authentication of the use of the functions of the service providing apparatus executing the coordination process, and the temporary token, which indicates the permission of the use of the service providing apparatus, in association with each other based on a determination that the coordination setting is not configured; and transmitting setting information (the URL) including the temporary token and address information, which indicates a storage location of a setting screen on which the coordination setting for the service providing apparatuses is to be configured, to a destination indicated by a communication address (the e-mail address) of a user identified by the user identification information (the user ID).

For example, the program that executes the service support processing according to the above-described embodiment is stored and provided as a file in an installable format or an executable format in a computer readable recording medium such as the CD-ROM, the flexible disk (FD), a CD-R, the DVD, or the USB memory stick through a network such as the Internet. In addition, various types of programs can be incorporated and provided in the ROM or the like.

The coordination support program, which executes the service support processing, according to the above-described embodiment, has a module configuration including the above functional units. As actual hardware, for example, the CPU (a processor circuit) reads the coordination support program from the ROM or the HDD and executes the program, so that each of the above-described functional units is loaded onto the RAM (main memory), and each of the above-described functional units is generated on the RAM (the main memory). The above-described functional units may partially or entirely be implemented by using dedicated hardware such as an Application-Specific Integrated Circuit (ASIC) or a Field-Programmable Gate Array (FPGA).

There is a case where a user logs in to a system via a device in a state where a coordination setting is not configured, and uses a coordination process corresponding to the coordination setting. In such case, according to the conventional art, the user has to additionally log in to the system from another device on which the coordination setting is configured, and then configure the coordination setting.

According to an embodiment of the present disclosure, the coordination support system, the coordination support method, and the program are provided that improve convenience.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:
1. A coordination support system for supporting a coordination process of a plurality of services provided by a service providing apparatus, the coordination support system comprising:
circuitry configured to
accept, from a device, login information including user identification information and coordination identifi- cation information of a particular coordination process to be executed that was selected by a user of the device, determine a plurality of particular services required for the particular coordination process to be executed, determine whether g coordination setting for execution of the plurality of particular services required for the particular coordination process identified by the coordination identification information is currently configured, store an authentication ticket and a temporary token in association with each other, only in response to determining that the coordination setting is not currently configured, the authentication ticket indicating authentication of use of a function of the service providing apparatus executing the particular coordination process, and the temporary token indicating permission of use of the service providing apparatus, and transmit setting information including address information and the temporary token to a destination device indicated by a communication address of the user identified by the user identification information, the address information indicating a storage location of a setting screen on which the coordination setting for the service providing apparatus is to be configured.

2. The coordination support system according to claim 1, wherein the circuitry is further configured to transmit the setting information including a plurality of pieces of address information used to access a plurality of setting screens on which a plurality of coordination settings are to be configured and a plurality of temporary tokens, to the destination indicated by the communication address of the user.

3. The coordination support system of claim 1, wherein the destination device indicated by the communication address is different from the device, and the circuitry is further configured to transmit, to the destination device, the authentication ticket associated with the temporary token, so that the coordination settings can be configured by the destination device without the destination device executing an additional login process.

4. A coordination support method performed by a coordination support system that supports a coordination process of a plurality of services provided by a service providing apparatus, the coordination support method comprising;

accepting, from a device, login information including user identification information and coordination identification information of a articular coordination process to be executed selected by a user of the device;

determining a plurality of particular services required for the particular coordination process to be executed;

determining whether a coordination setting for execution of the plurality of particular services required for the particular coordination process identified by the coordination identification information is currently configured;

storing an authentication ticket and a temporary token in association with each other, only in response to determining that the coordination setting is not currently configured, the authentication ticket indicating authentication of use of a function of the service providing apparatus executing the particular coordination process, and the temporary token indicating permission of use of the service providing apparatus; and transmitting setting information including address information and the temporary token to a destination device indicated by a communication address of the user identified by the user identification information, the address information indicating a storage location of a setting screen on which the coordination setting for the service providing apparatus is to be configured.

5. A non-transitory computer-readable storage medium storing a program for causing a coordination support system that supports a coordination process of a plurality of services provided by a service providing apparatus to execute a method, the method comprising:

accepting, from a device, login information including user identification information and coordination identification information of the coordination process to be executed from a device;

determining a plurality of particular services required for the particular coordination process to be executed;

determining whether a coordination setting for execution of the plurality of particular services required for the particular coordination process identified by the coordination identification information is currently configured;

storing an authentication ticket and a temporary token in association with each other, only in response to determining that the coordination setting is not currently configured, the authentication ticket indicating authentication of use of a function of the service providing apparatus executing the particular coordination process, and the temporary token indicating permission of use of the service providing apparatus; and transmitting setting information including address information and the temporary token to a destination device indicated by a communication address of the user identified by the user identification information, the address information indicating a storage location of a setting screen on which the coordination setting for the service providing apparatus is to be configured.

* * * * *